Aug. 5, 1958 W. HEINEMANN ET AL 2,846,052
LETTER-SORTING MACHINE
Filed Oct. 13, 1953
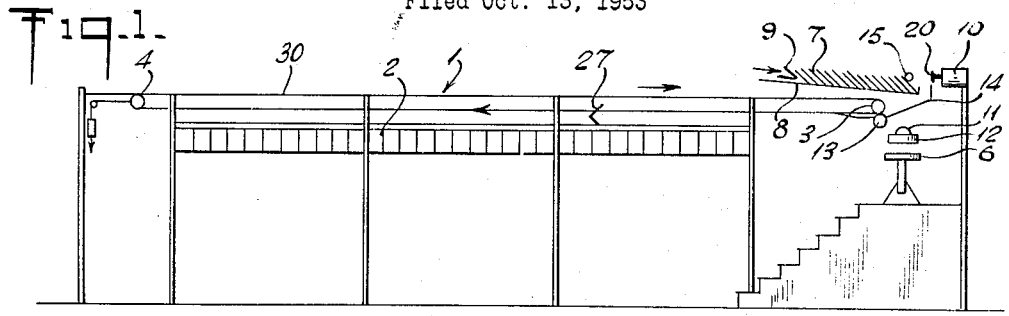
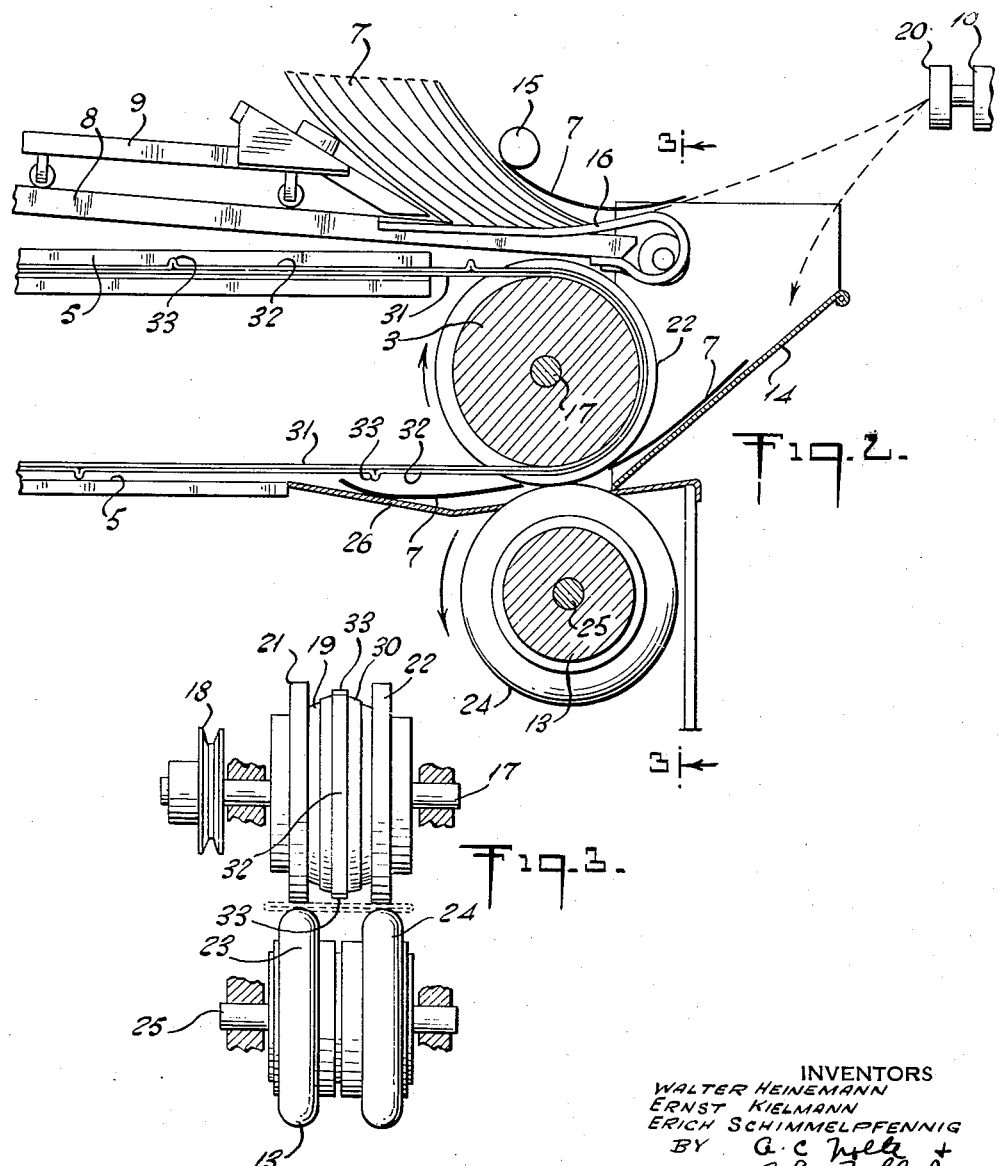
INVENTORS
WALTER HEINEMANN
ERNST KIELMANN
ERICH SCHIMMELPFENNIG
ATTORNEY United States Patent Office 2,846,052
Patented Aug. 5, 1958

2,846,052

LETTER-SORTING MACHINE

Walter Heinemann, Werder, Havel, Ernst Kielmann, Berlin-Baumschulenweg, and Erich Schimmelpfennig, Berlin, Germany, assignors to V E B Werk fur Signal- und Sicherungstechnik, Berlin, Berlin-Treptow, Germany Application October 13, 1953, Serial No. 385,861

2 Claims. (Cl. 198—167)

The invention relates to a letter-sorting machine, and more particularly to means for feeding letters toward the conveyor belt of a high-speed letter-sorting machine.

In known letter-sorting machines, letters are transferred from an operator's station to a plurality of receptacles by means of a rapidly moving belt and are selectively discharged from the belt into individual receptacles by deflecting devices controlled from the operator's station.

Because of the high speed of the traveling belt and the fragility of letter envelopes it is important that the letters be transferred to the conveyor in such a manner that at the instant of contact between the belt and the letter, their relative velocity be as small as possible.

An object of the invention is to provide means for transferring letters to the traveling conveyor-belt of a letter-sorting machine at substantially the speed of the conveyor-belt.

Another object is the provision of such transferring means which are of simple and rugged construction.

Other objects and advantages of the invention will hereinafter become more fully apparent from the following description of the annexed drawings, which illustrate a preferred embodiment, and wherein:

Fig. 1 shows a side elevation of a letter-sorting machine equipped with the feeding means of the invention;

Fig. 2 shows a detail of the machine of Fig. 1 on an enlarged scale, partly in vertical section, and Fig. 3 shows a fragmentary front elevation of the feeding means of the invention taken in the direction of arrows 3—3.

Referring now to the drawings, Figs. 1 and 2 show a letter-sorting machine 1 having a row of receptacles 2, an endless conveyor belt 30 traveling between pulleys 3 and 4 in a channel 5, and deflection devices 27 for discharging letters from the conveyor belt 30 into receptacles 2. The operator's station is indicated by a stool 6 located at one end of the machine 1. Letters 7 are horizontally stacked at the operator's station on a platform 8 which is slightly inclined towards the right. A rolling weight 9 urges the letters towards the end of the platform 8. A pneumatic pick-up device 10 of known construction and having a pick-up head 20 is arranged opposite the end of the platform for individually picking up letters 7 and dropping them on an inclined chute 14 which directs them between the driving pulley 3 and a guide roller 13.

The pneumatic pick-up device 10 is actuated by a pushbutton 11 in a switchboard 12 at the operator's station from which the deflection devices 27 may also be controlled.

As best seen in Fig. 2, the letters 7 which are urged toward the chute 14 by the rolling weight 9 are restrained by a fixed rotary bar 15 which is fastened to the frame of the machine 1 and a cooperating spring 16 thus preventing the suction head 20 of pneumatic pick-up device 10 from taking more than one letter at a time from the stack. The suction head 20 of pneumatic pick-up device 10 is automatically controlled to move towards the stack of letters 7, suction being applied when the head contacts the first letter and, while it is retracted, taking the letter with it. When suction head 20 on its retraction stroke reaches a predetermined position, suction is cut off and the letter is dropped into chute 14 which directs it between pulleys 3 and 13.

Referring now to Fig. 3, driving pulley 3 is fixedly mounted on a shaft 17 which is driven by the main drive motor of the sorting-machine, a transmission pulley 18 being connected to the drive by a belt (not shown). The driving pulley 3 comprises a central driving wheel 19 carrying the belt 30 and a pair of discs 21, 22 rigidly and coaxially connected to driving wheel 19 at opposite sides, the discs 21, 22 being of equal diameter greater than that of the driving wheel 19. A guide roller 13 having two discs 23, 24, spaced to functionally engage the peripheral edges of discs 21, 22, respectively, is mounted on shaft 25 which is journaled in the frame of the letter-sorting machine. Discs 23, 24 are of substantially the same diameter as discs 21, 22.

As seen in Figs. 2 and 3, belt 30 is of composite structure having a relatively wide inner portion 31 for contact with pulleys 3 and 4 and a narrower outer portion 32 folded over against itself at regular intervals along the length of the belt to form upstanding catch members 33 extending substantially perpendicularly from the body of belt 30.

The device of the invention operates as follows:

A stack of letters 7 is placed horizontally on the platform 8, one end of the stack abutting against rotary bar 15, the stack being urged against the rotary bar 15 by rolling weight 9. When the pick-up device is actuated by the operator, a letter is taken from the top of the stack and is dropped onto the chute 14. It is seized by the discs 21, 22 cooperating with discs 23, 24 and projected tangentially towards a deflector plate 26 which directs the letter 7 towards the conveyor belt 30. Because of the difference in diameter between driving wheel 19 and discs 21, 22, the letter is projected from the discs 21, 22 at a speed somewhat greater than that of belt 30. At the moment of contact between the letter and the traveling belt, the letter is thus moving substantially at the same speed as the belt and any damage resulting from relative movement of belt and letter is avoided.

The letter is projected into the angular space formed between deflector plate 26 and the belt and is entrained by the narrow portion of conveyor belt 30, the edges of the letters being engaged by the catch members 33 formed in said belt. The letters are carried along in the space formed between the belt 3 and the bottom of letter-transporting channel 5 to a point where they are deflected by devices 27 into receptacles 2, the point of discharge being controlled by the operator in a known manner.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. In a high-speed letter-sorting machine equipped with an endless conveyer belt and with a rotatable driving wheel drivingly engaging said belt; means for feeding letters toward said conveyer belt, comprising a pair of first discs rigidly and coaxially connected to said driving wheel at opposite sides of the latter and for rotation therewith, the diameters of said first discs being substantially equal to one another and greater than the diameter of said driving wheel, and a guide roller rotatably juxtaposed to said driving wheel, said guide roller being provided with a pair of second discs rigidly and coaxially connected to said guide roller at opposite sides thereof and for rotation therewith, the peripheral edge of each of said second discs being in frictional rolling contact with the peripheral edge of the corresponding one of said first discs, the diameters of said second discs being substantially equal to one another and to said diameters of said first discs, whereby letters frictionally entrained between and tangentially of said peripheral edges of said first and second discs are fed by the same, during rotation thereof upon operation of said driving wheel, toward said conveyer belt at a speed higher than the speed of said conveyer belt to ensure that at the instant of contact said letters and said conveyer belt are traveling at substantially the same speed.

2. In a machine according to claim 1, said conveyer belt comprising a first closed loop belt portion of predetermined width and having an inner surface and an outer surface, said inner surface being in engagement with said driving wheel intermediate said first discs, and a second belt portion narrower than said first belt portion and attached to the latter at said outer surface thereof and substantially along the entire length of said first belt portion, said second belt portion being folded over against itself at a plurality of regularly and longitudinally spaced locations to form a plurality of upstanding catch members extending substantially perpendicularly to said first and second belt portions for engagement with edges of said letters subsequent to feeding thereof to said conveyer belt by said first and second discs.

References Cited in the file of this patent

UNITED STATES PATENTS

| | | |
|---|---|---|
| 908,377 | Barry | Dec. 29, 1908 |
| 1,214,394 | Trew | Jan. 30, 1917 |
| 1,823,741 | Ielfield | Sept. 15, 1931 |
| 2,010,130 | Barnes | Aug. 6, 1935 |
| 2,014,447 | Needham | Sept. 17, 1935 |
| 2,656,054 | Gleason | Oct. 20, 1953 |